United States Patent
Park et al.

(10) Patent No.: US 8,625,685 B2
(45) Date of Patent: Jan. 7, 2014

(54) SIGNAL QUALITY ESTIMATION FOR OFDMA SYSTEMS

(75) Inventors: Jong Hyeon Park, San Jose, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1013 days.

(21) Appl. No.: 12/035,394

(22) Filed: Feb. 21, 2008

(65) Prior Publication Data

US 2009/0213919 A1 Aug. 27, 2009

(51) Int. Cl.
*H04K 1/10* (2006.01)
*H04L 27/28* (2006.01)

(52) U.S. Cl.
USPC .......................................... 375/260; 375/227

(58) Field of Classification Search
USPC .................. 375/227, 260, 267, 316
See application file for complete search history.

(56) References Cited

U.S. PATENT DOCUMENTS

| | | | |
|---|---|---|---|
| 7,623,569 B2 | 11/2009 | Chang et al. | |
| 2004/0076172 A1* | 4/2004 | Sano | 370/442 |
| 2006/0078040 A1* | 4/2006 | Sung et al. | 375/140 |
| 2007/0255993 A1* | 11/2007 | Yap et al. | 714/748 |
| 2008/0240217 A1* | 10/2008 | Lee et al. | 375/227 |
| 2009/0022254 A1* | 1/2009 | Na et al. | 375/346 |

FOREIGN PATENT DOCUMENTS

| | | | |
|---|---|---|---|
| CN | 1354581 | A | 6/2002 |
| CN | 101052205 | A | 10/2007 |
| EP | 1207663 | A2 | 5/2002 |
| EP | 1473956 | A2 | 11/2004 |
| EP | 1555761 | A1 * | 7/2005 |
| JP | 2001292124 | A | 10/2001 |
| JP | 2004088179 | A | 3/2004 |
| JP | 2007295257 | A | 11/2007 |
| JP | 2009514402 | | 4/2009 |
| KR | 100678193 | | 2/2007 |
| RU | 2295843 | C2 | 3/2007 |
| WO | WO2007021159 | A2 | 2/2007 |
| WO | WO2007078086 | A1 | 7/2007 |

OTHER PUBLICATIONS

Lee et al., Performance Improvement of Channel Estimation based on Pilot Structure Variations for Cellular OFDMA System, IEEE, 2004, pp. 989-993.*
International Search Report and Written Opinion—PCT/US2008/067449, International Search Authority—European Patent Office—Nov. 4, 2008.
Taiwan Search Report—TW097127672—TIPO—Feb. 9, 2012.

* cited by examiner

*Primary Examiner* — Chieh M Fan
*Assistant Examiner* — Freshteh N Aghdam
(74) *Attorney, Agent, or Firm* — Charles Chesney

(57) ABSTRACT

Certain embodiments utilize raw signals to estimate channel quality, as contrasted to utilizing equalized signals or after channel estimation. For example, signal quality may be estimated by calculating powers of pilot sub-carriers and null sub-carriers of the raw signals. To mitigate channel effect, certain embodiments utilize first and/or second order differentiation schemes.

36 Claims, 11 Drawing Sheets

SIGNAL QUALITY ESTIMATION FOR OFDMA SYSTEMS

TECHNICAL FIELD

The present application relates generally to communication systems. More specifically, the present application relates to methods and apparatus for measuring signal quality in communication systems.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Some standards for wireless communications require some type of measurement of signal quality to be made at a mobile station and communicated back to a base station. Unfortunately, it is difficult to estimate signal quality accurately because the received signal is affected by channel conditions and mixed with interference and noise.

SUMMARY

Figure 1:
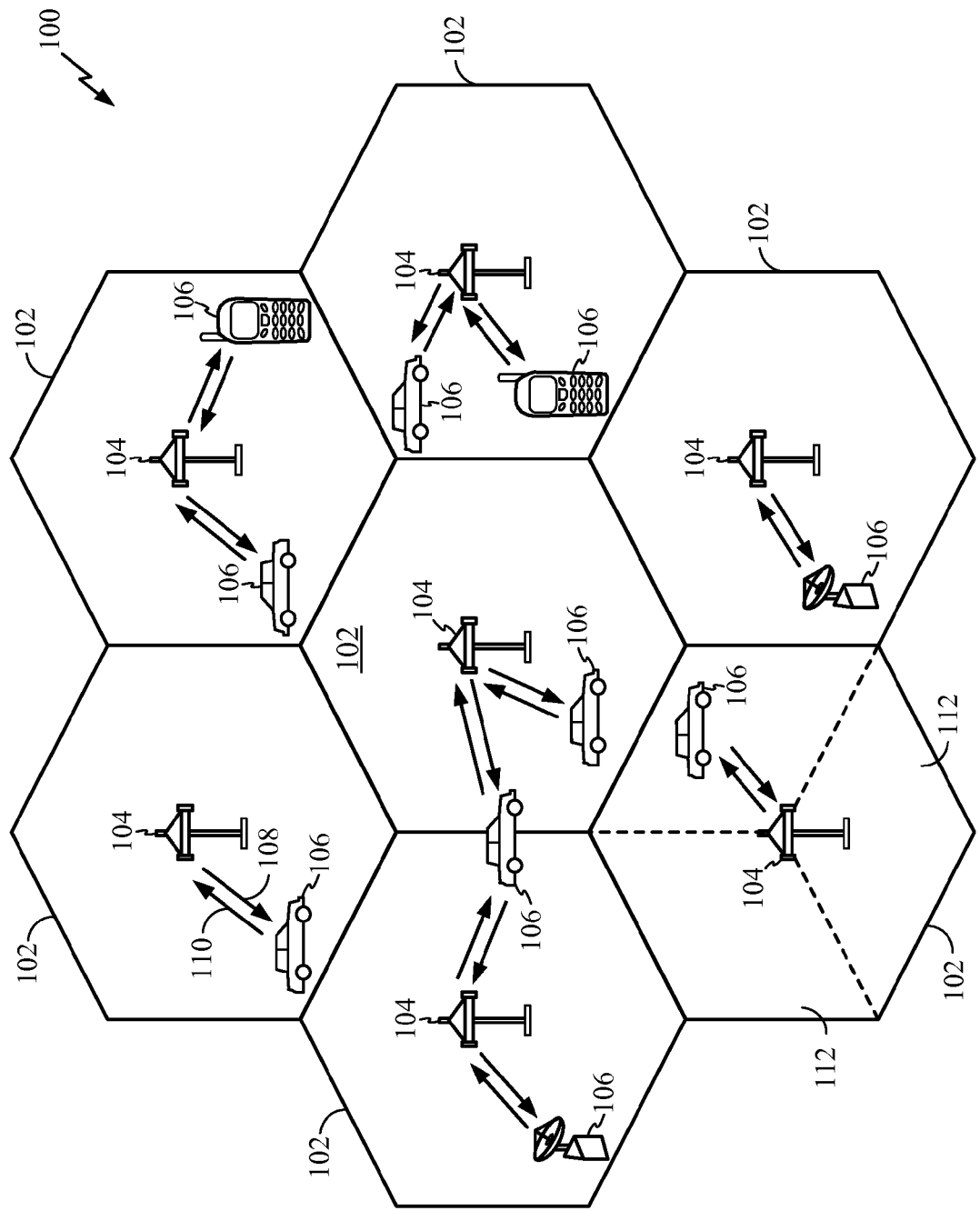
FIG. 1 illustrates an example of a wireless communication system.

Certain embodiments provide a method, a receiver, an apparatus, and a mobile device for performing signal quality calculations.

The method generally includes transforming, into a frequency domain, raw preamble signals received from a station, extracting first pilot sub-carrier signals corresponding to a first preamble segment from the transformed preamble signals, performing N-order differential operations on the first pilot sub-carrier signals to generate differential pilot signals, wherein N is an integer greater than 1, taking separate power measurements for the first pilot sub-carrier signals and the differential pilot signals, calculating one or more signal quality parameters using the separate power measurements for the first pilot sub-carrier signals and the differential pilot signals, and transmitting the signal quality parameters to the station.

The receiver generally includes transform logic for transforming, into a frequency domain, raw preamble signals received from a station and extracting first pilot sub-carrier signals corresponding to a first preamble segment from the transformed preamble signals, differential logic for performing N-order differential operations on the first pilot sub-carrier signals to generate differential pilot signals, wherein N is an integer greater than 1, measurement logic for taking separate power measurements for the first pilot sub-carrier signals and the differential pilot signals, and signal quality logic for calculating one or more signal quality parameters using the separate power measurements for the first pilot sub-carrier signals and the differential pilot signals.

The apparatus generally includes means for transforming, into a frequency domain, raw preamble signals received from a station, means for extracting first pilot sub-carrier signals corresponding to a first preamble segment from the transformed preamble signals, means for performing N-order differential operations on the first pilot sub-carrier signals to generate differential pilot signals, wherein N is an integer greater than 1, means for taking separate power measurements for the first pilot sub-carrier signals and the differential pilot signals, means for calculating one or more signal quality parameters using the separate power measurements for the first pilot sub-carrier signals and the differential pilot signals, and means for transmitting the signal quality parameters to the station.

The mobile device generally includes a receiver for transforming, into a frequency domain, raw preamble signals received from a station and extracting first pilot sub-carrier signals corresponding to a first preamble segment from the transformed preamble signals, measuring logic for performing N-order differential operations on the first pilot sub-carrier signals to generate differential pilot signals, wherein N is an integer greater than 1, taking separate power measurements for the first pilot sub-carrier signals and the differential pilot signals, and calculating one or more signal quality parameters using the separate power measurements for the first pilot sub-carrier signals and the differential pilot signals, and a transmitter for transmitting the signal quality parameters to the station.

DETAILED DESCRIPTION

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standard-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Mobile WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is sent over one of a plurality of parallel sub-channels. OFDMA is a multiple access technique in which users are assigned to different sub-carriers over different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages like modulation efficiency, spectrum efficiency, flexibility, and strong multipath immunity with relatively simple equalizer over some single carrier modulation schemes.

IEEE 802.16x is an emerging standard organization to define an air interface for fixed and mobile broadband wireless access (BWA) systems. IEEE 802.16x approved '16d in May 2004 for fixed BWA systems and published '16e in October 2005 for mobile BWA systems. Those two standards defined four different physical layers (PHYs) and one medium access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system 100. The wireless communication system 100 provides communication for a number of cells 102, each of which is serviced by a base station 104. A base station 104 may be a fixed station that communicates with user terminals 106. The base station 104 may alternatively be referred to as an access point, a Node B or some other terminology.

FIG. 1 shows various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system 100.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within an OFDM/OFDMA system 100 may utilize antennas that concentrate the flow of power within a particular sector 112 of the cell 102. Such antennas may be referred to as directional antennas.

Figure 2:
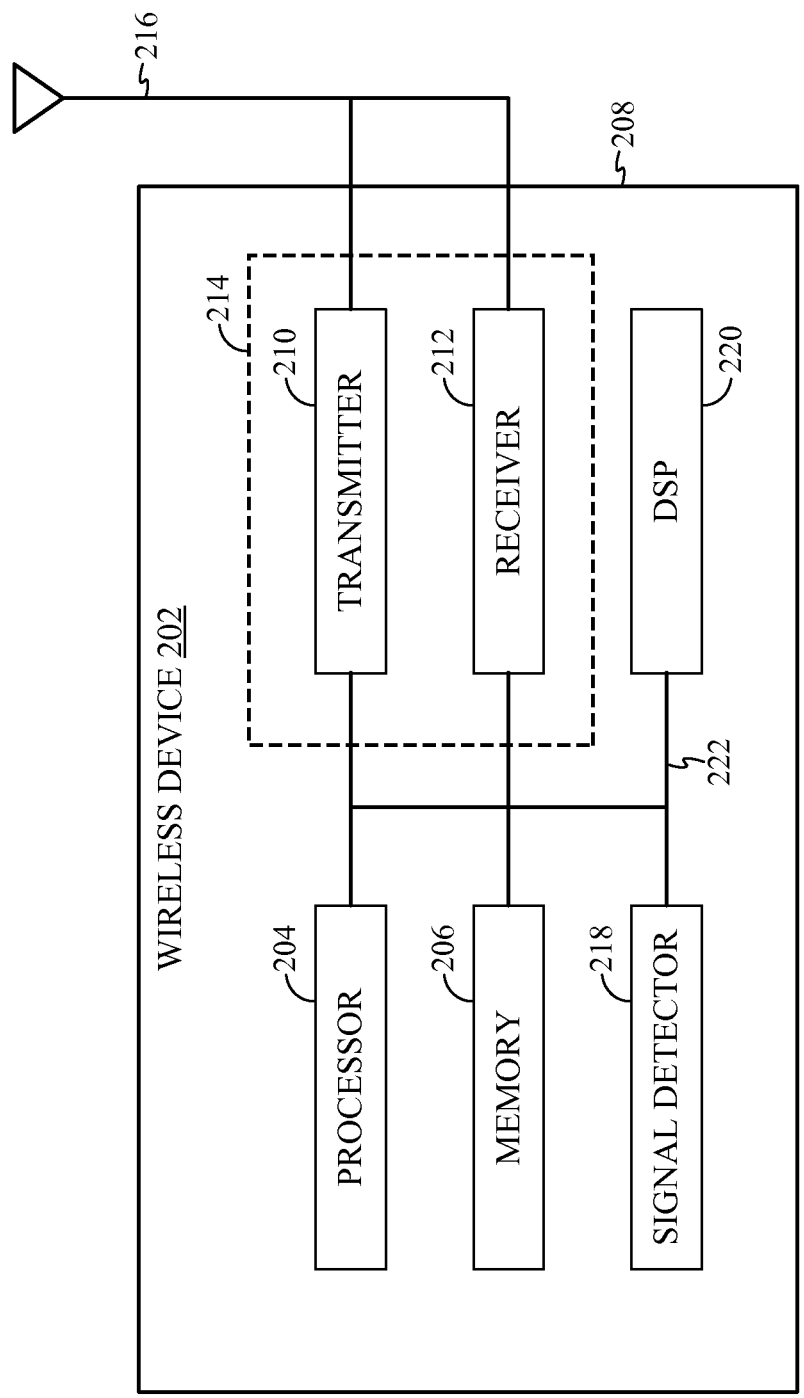
FIG. 2 illustrates examples of various components that may be utilized in a wireless device using OFDM or OFDMA method.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers and/or multiple antenna.

The wireless device 202 may also include a signal detector 218 that may be used to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222 which may include a power bus, a control signal bus, and a status signal bus in addition to a data bus. However, for the sake of clarity, the various busses are illustrated as the bus system 222.

Figure 3:
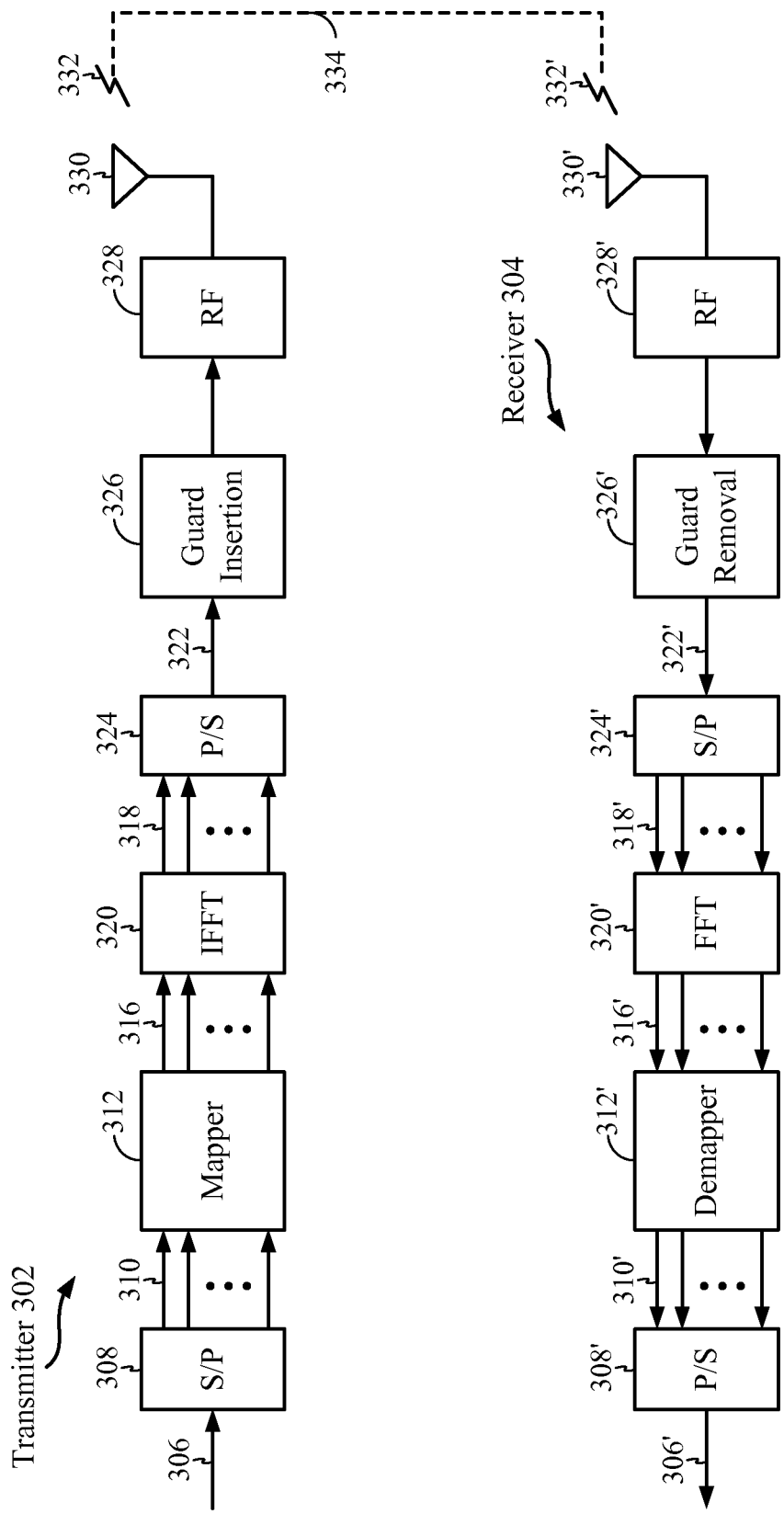
FIG. 3 illustrates an example of a transmitter and an example of a receiver that may be used within a wireless communication system that utilizes orthogonal frequency division multiplexing (OFDM) and orthogonal frequency divisional multiple access (OFDMA)

FIG. 3 illustrates an example of a transmitter 302 that may be used within a wireless communication system 100 that utilizes OFDM/OFDMA. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 splits the transmission data into N parallel data streams 310.

The N parallel data streams 310 may then be provided as input to a mapper 312. The mapper 312 maps the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 outputs N parallel symbol streams 316, each symbol stream 316 corresponding to one of the N orthogonal sub-carriers of the inverse fast Fourier transform (IFFT) 320. These N parallel symbol streams 316 are represented in the frequency domain, and may be converted into N parallel time domain sample streams 318 by an (IFFT component 320.

A brief note about terminology will now be provided. N parallel modulations in the frequency domain are equal to N modulation symbols in the frequency domain, which are equal to N mapping plus N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. The receiver 304 may be implemented in a user terminal 106 for receiving data 206 from a base station 104 on a downlink 108. The receiver 304 may also be implemented in a base station 104 for receiving data 306 from a user terminal 106 on an uplink 110.

The transmitted signal 332 is shown traveling over a wireless channel 334; however wired channels may also be used for certain embodiments. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal sub-carriers. A fast Fourier transform (FFT) component 320' converts the N parallel time-domain symbol streams 318' into the frequency domain, and outputs N parallel frequency-domain symbol streams 316'.

A demapper 312' performs the inverse of the symbol mapping operation that was performed by the mapper 312, thereby outputting N parallel data streams 310'. A P/S converter 308' combines the N parallel data streams 310' into a single data stream 306'. Ideally, this data stream 306' corresponds to the data 306 that was provided as input to the transmitter 302.

Certain embodiments of the present disclosure utilize raw signals to estimate channel quality, as opposed utilizing equalized signals or after channel estimation. For example, signal quality may be estimated by calculating powers of pilot sub-carriers and null sub-carriers of the raw signals. To mitigate channel effect, certain embodiments utilize first and/or second order differentiation schemes.

The techniques presented herein may be utilized to calculate a variety of signal quality measurements, such as CINR, CNR and CIR. The present disclosure also provides estimation methods that depend on permutation zones, such as a preamble zone, PUSC zone, and major groups of the PUSC zone.

Figure 4:
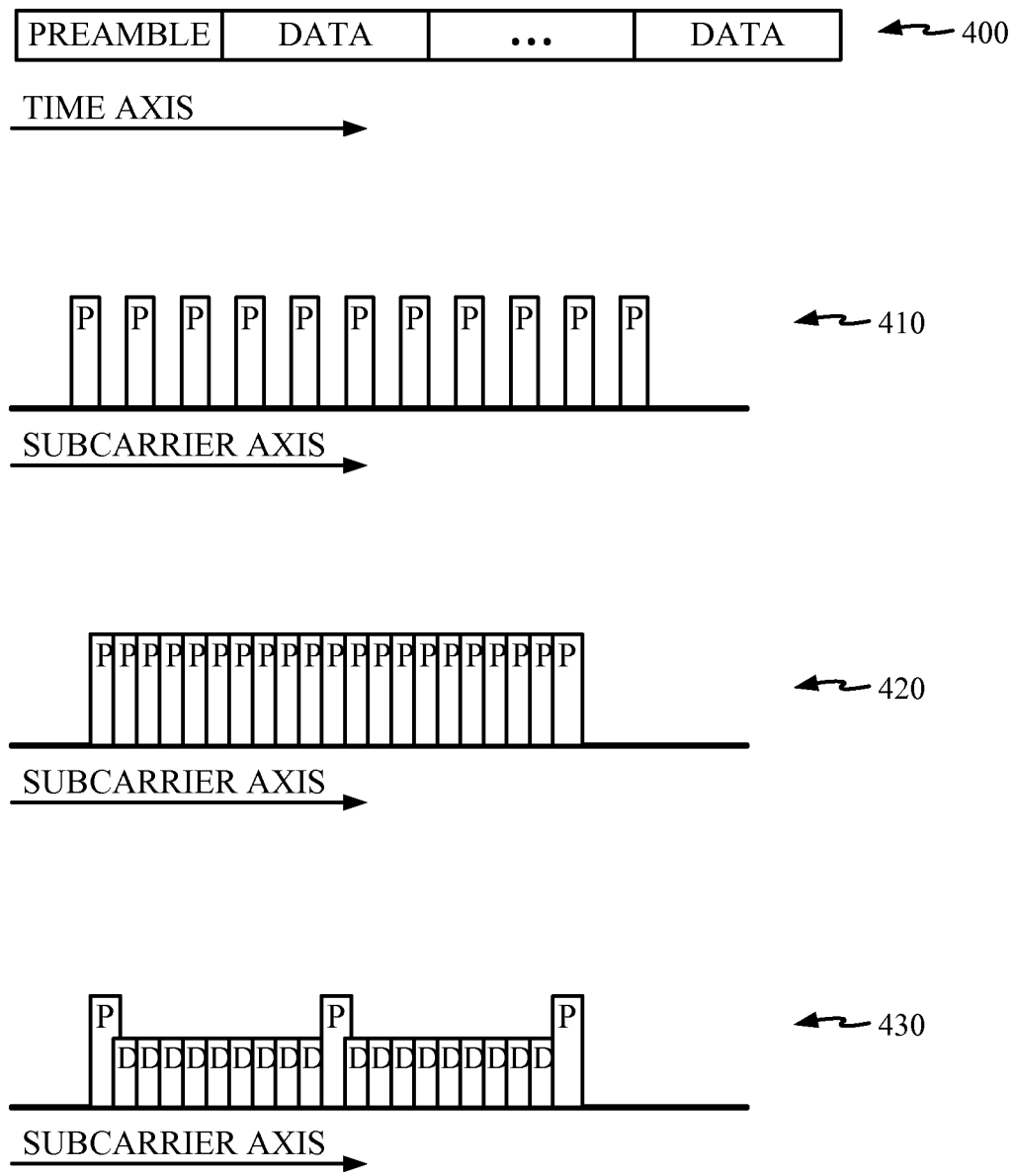
FIG. 4 illustrates an example OFDM/OFDMA frame structure.

As stated above, a wireless device may communicate with a base station utilizing an OFDM/OFDMA digital modulation scheme. FIG. 4 illustrates an example frame structure for OFDMA systems as well as illustrations representing preamble symbols and data symbols.

An OFDM frame 400 consists of one or more preambles and several data symbols. A preamble symbol contains equally spaced pilot sub-carriers as illustrated by element 410. In certain embodiments, the preamble symbol may consist of pilot sub-carriers being used for each sub-carrier as illustrated by element 420. A data symbol consists of data pilot sub-carriers surround by one or more data sub-carriers, as illustrated by element 430.

In an IEEE802.16e compliant OFDMA system three types of preamble carrier sets (PCSs) may be used. The PCSs are defined by an allocation of sub-carriers, wherein the carrier sets are mutually exclusive. The preamble carrier-sets are defined using the following equation:

$$PA_{cset} = s + 3z \qquad (1)$$

In EQ. 1, $PA_{cset}$ specifies a set of all sub-carriers allocated to a specific preamble, while 's' is an index identifying a specific PCS, and 'z' is a running index ranging from 0 to M−1, wherein M is the length of the PN code. For example, if the FFT element converts 1024 parallel time-domain symbol streams into the frequency domain, and outputs 1024 parallel frequency-domain symbol streams, the corresponding PN code length (M) would be 284.

The three PCS types correspond to 's' values ranging from 0 to 2, where each PCS coincides with a segment of a sector. Specifically, segment 0 (S0) uses PCS 0, segment 1 (S1) uses PCS 1, and segment 2 (S2) uses PCS 2. In the case of S0, the DC carrier will not be modulated at all, and the appropriate PN will be discarded; therefore, the DC carrier can be zeroed. Each segment of the sector uses a preamble composed of one of the three available carrier sets as outlined above.

In certain embodiments of the present disclosure, the sub-carriers are modulated using a boosted binary phase shifting key (BPSK) modulation with a specific Pseudo-Noise (PN) code.

Figure 5:
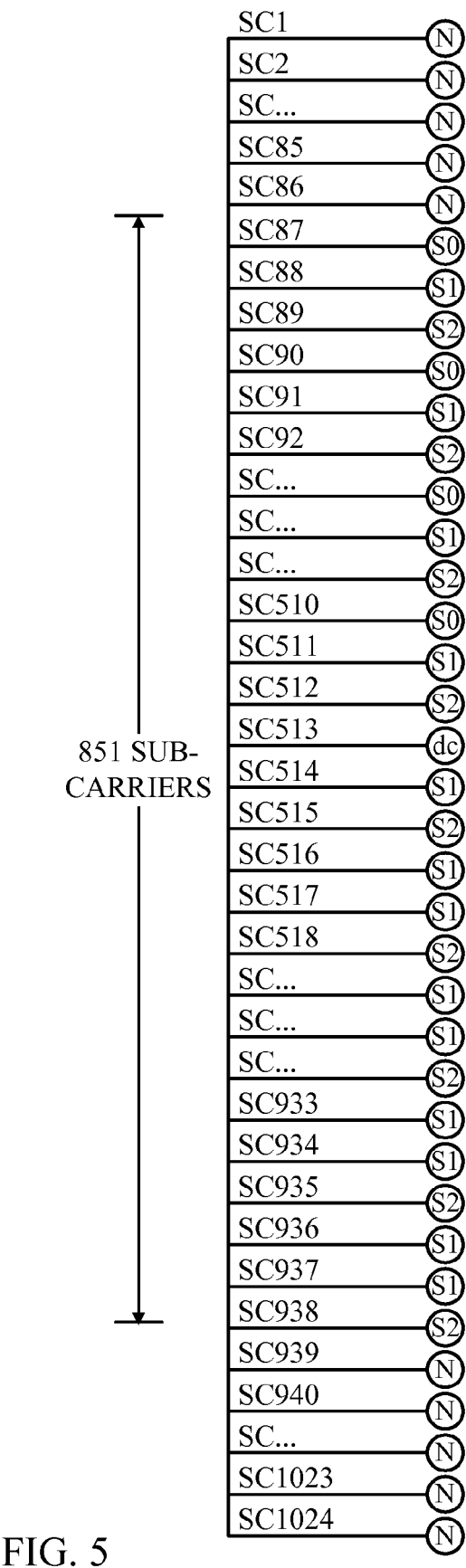
FIG. 5 illustrates an example of an OFDMA preamble in the frequency domain.

FIG. 5 illustrates an example OFDMA preamble in the frequency domain. In accordance with 802.16(e), the preamble symbol of a signal with a FFT size of 1024 streams is encapsulated by 86 null sub-carriers (denoted by an N), serving as a guard band on either side of the spectrum, while inner sub-carriers are divided among three segments [S0, S1, S2] as described above. Further, the distribution of the sub-carriers among the three segments is defined by Equation 1. However, when the preamble is encapsulated by 86 null sub-carriers, the PCS corresponding to S0=[SC87, SC90, SC93, . . . , SC936]; the PCS corresponding to S1=[SC88, SC91, SC94, ..., SC937]; and the PCS corresponding to S2=[SC89, SC92, SC95, ..., SC938], as illustrated in FIG. 5.

Under various standards for wireless communications, such as the IEEE 802.16(e) standard, a measurement of signal quality at a mobile station is required to be sent back to the base station. A variety of different types of signal quality parameters may be calculated as a measure of signal quality including CNR (carrier to noise ratio), CIR (carrier to interference ratio), and CINR (carrier to interference/noise ratio).

Figure 6:
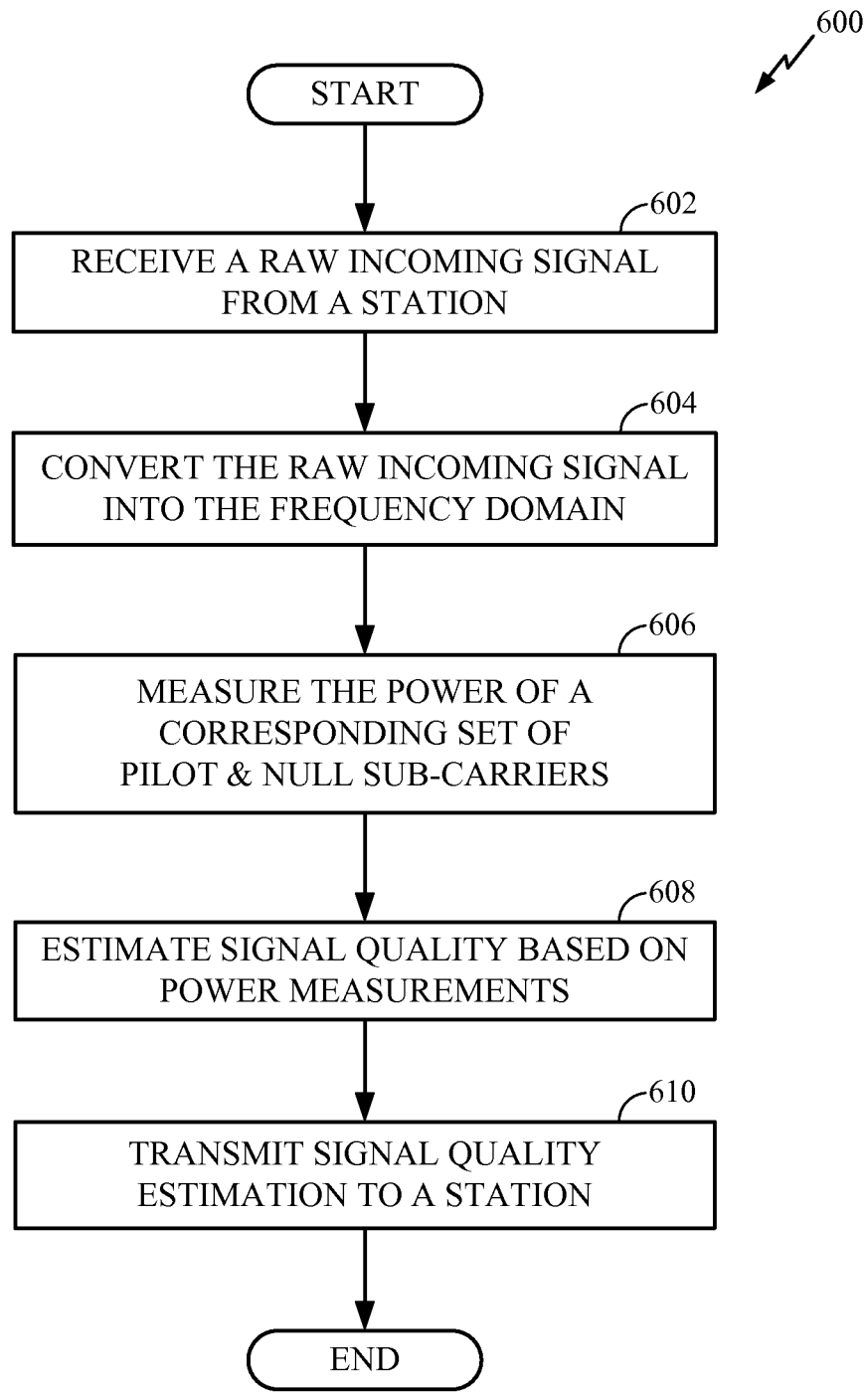
FIG. 6 illustrates example operations for signal quality estimation in accordance with certain embodiments.

FIG. 6 illustrates example operations 600 for taking signal quality measurements in accordance with certain embodiments of the present disclosure. The operations 600 begin, at 602, by receiving a raw incoming signal. At 604, the raw signal is converted into the frequency domain, for example, by applying an FFT. Using the raw signals in the frequency domain, the power of a corresponding set of pilot and null sub-carriers is measured, at 606. With the power measurements of the pilot and null sub-carriers, signal quality estimates, such as CNR, CIR, and CINR, are calculated at 608. The signal quality estimation is transmitted to a base station, at 610.

Figure 7:
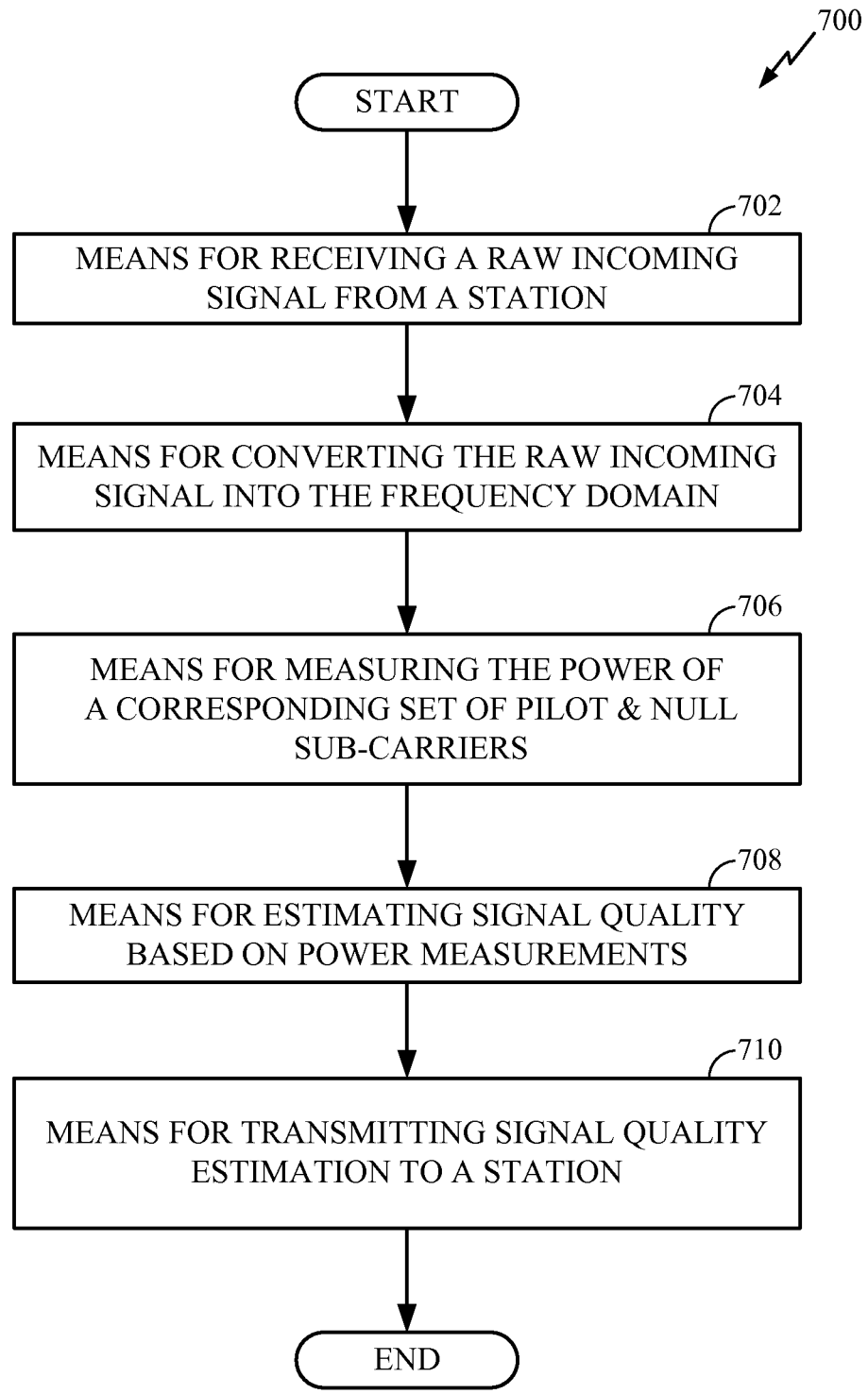
FIG. 7 illustrates components for performing operations shown in FIG. 6.

The operations 600 of FIG. 6, described above, may be performed by various hardware and/or software component(s) and/or module(s) corresponding to the means-plus-function blocks 700 illustrated in FIG. 7. In other words, blocks 602 through 610 illustrated in FIG. 6 correspond to means-plus-function blocks 702 through 710 illustrated in FIG. 7.

For certain embodiments, various power measurements described below may be performed with hardware components (e.g., circuit implementations of logic blocks described below), with the resulting power measurements stored in software-accessible registers. Software algorithms may access the power measurements from these registers and calculate signal various quality parameters (to be transmitted back) utilizing the equations set forth below. For certain embodiments, the operations may be performed on a frame-by-frame basis. Therefore, components, such as accumulation logic and registers used to store results may be reset before performing the operations described herein on each new frame.

Power measurements may be taken for raw signals of both null and pilot sub-carriers. Power measurements of the null sub-carriers may yield information about noise power, as noise should be the contributing factor to power at these sub-carriers. Power measurements of the pilot sub-carriers, on the other hand, may yield information about signal, interference, and noise power. As will be described in greater detail below, N-order differential measurements (N=1 or more) may be performed on the sub-carrier signal samples in an effort to isolate noise and interference contributions.

Figure 8:
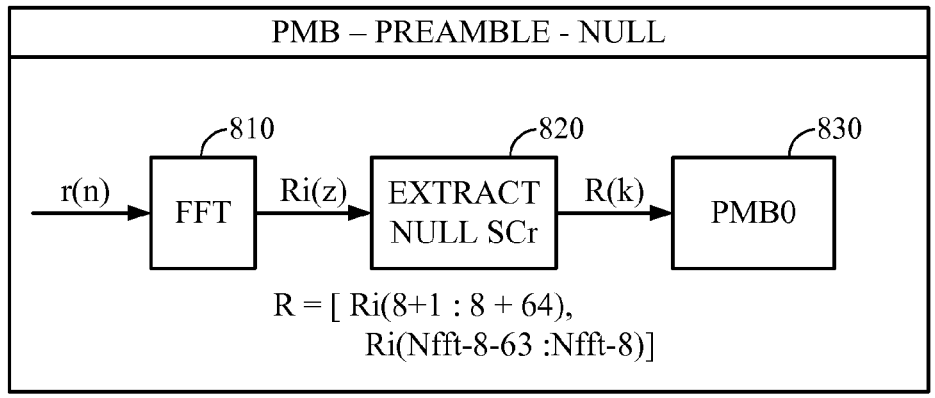
FIG. 8 illustrates logic for an example power measuring block for a null position in a preamble.

FIG. 8 illustrates example logic for measuring power of null sub-carriers in the preamble. As illustrated, the raw signal r(n) is first transformed into the frequency domain (e.g., by FFT logic 810). Null sub-carrier signals are then extracted from the resulting signals with logic 820. For example, logic 820 may extract certain null sub-carrier signals from left and right guard-band signals. In the illustrated example, logic 820 extracts 64 samples each from the left and right guard bands. A power measurement block (PMB) 830 may calculate power on the extracted signals.

Figure 9:
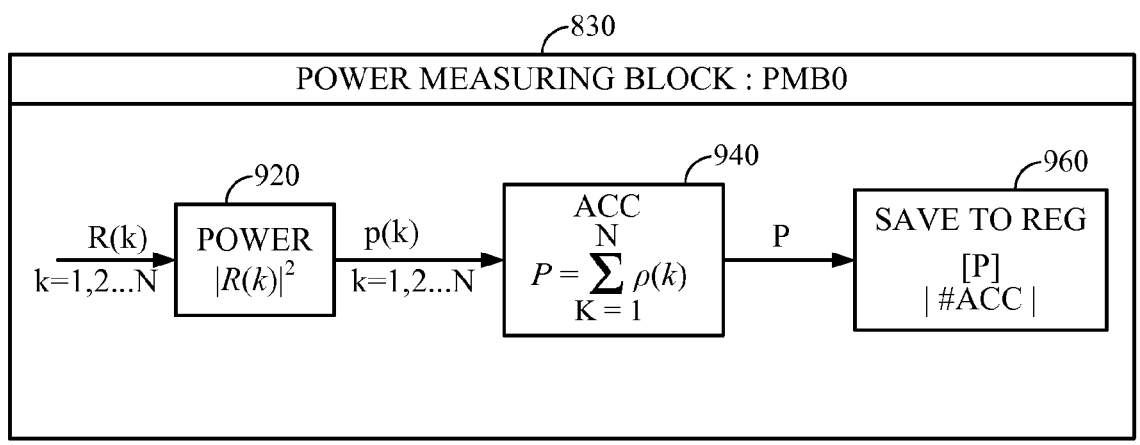
FIG. 9 illustrates logic for an example power measuring block.

FIG. 9 illustrates a PMB 830 in accordance with a certain embodiment of the present disclosure. In general, the PMB 830 may take N samples, calculate the power for each sample with logic 920, accumulate the power with logic 940, and store the accumulated power in a register 960. In addition to the accumulated power measurement, a mean power measurement may also be calculated (e.g., dividing the accumulated power by N). The mean power measurement may be performed in hardware and also stored in a register or performed in software using the accumulated power stored in the register.

Figure 10:
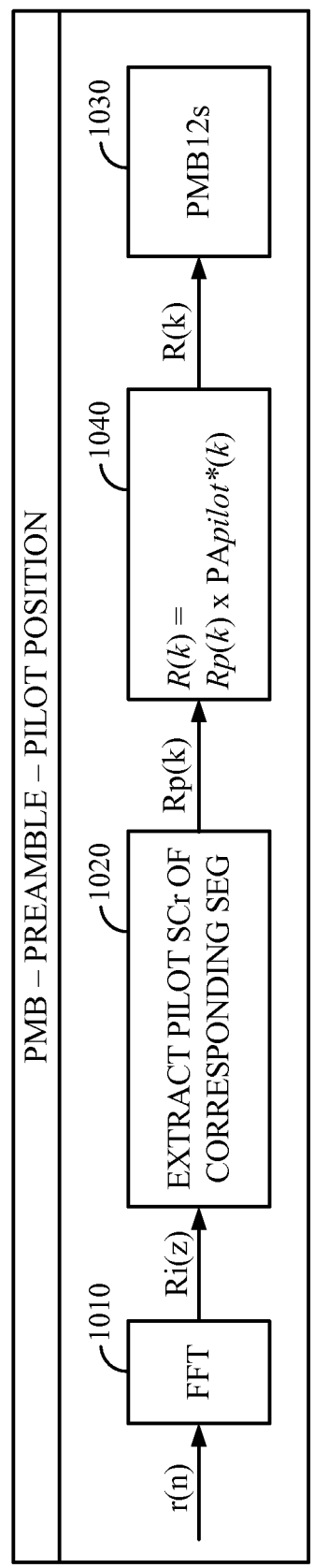
FIG. 10 illustrates logic for an example power measuring block with pilot position.

FIG. 10 illustrates example logic for measuring power of pilot signal sub-carrier positions. The example logic may be used to measure pilot signals in the "self-segment" segment used by the preamble of interest. Different logic may be used to measure power for pilot positions corresponding to other segments in the preamble. The power measurements of pilot signals in the other segments may yield useful information, for example, regarding noise and interference.

As illustrated in FIG. 10, the raw signals r(n) are first transformed into the frequency domain (e.g., by FFT logic 1010). Pilot signals at sub-carriers corresponding to the appropriate segment are then extracted with logic 1020. For example, assuming segment 0 and the preamble illustrated in FIG. 5, pilot signals at sub-carriers SC87, SC90, and so forth, may be extracted. The extracted pilot signals may be multiplied by a complex conjugate of a normalized reference pilot signal at the kth sub-carrier, PApilot(k), by logic 1040 before power calculations, yielding samples R(k). This multiplication may be performed without considering a boosting factor, which may be taken into consideration during later calculations described below.

A differential power measuring block (PMB) 1030 may be used to measure power, not only on the original sample R(k), but also on differential signals produced by first or second (or higher) order differential operations performed on the samples. These differential operations may serve to cancel out certain signal components, while preserving others. As a result, the differential operations may help more accurately estimate noise, interference, and signal components.

Figure 11:
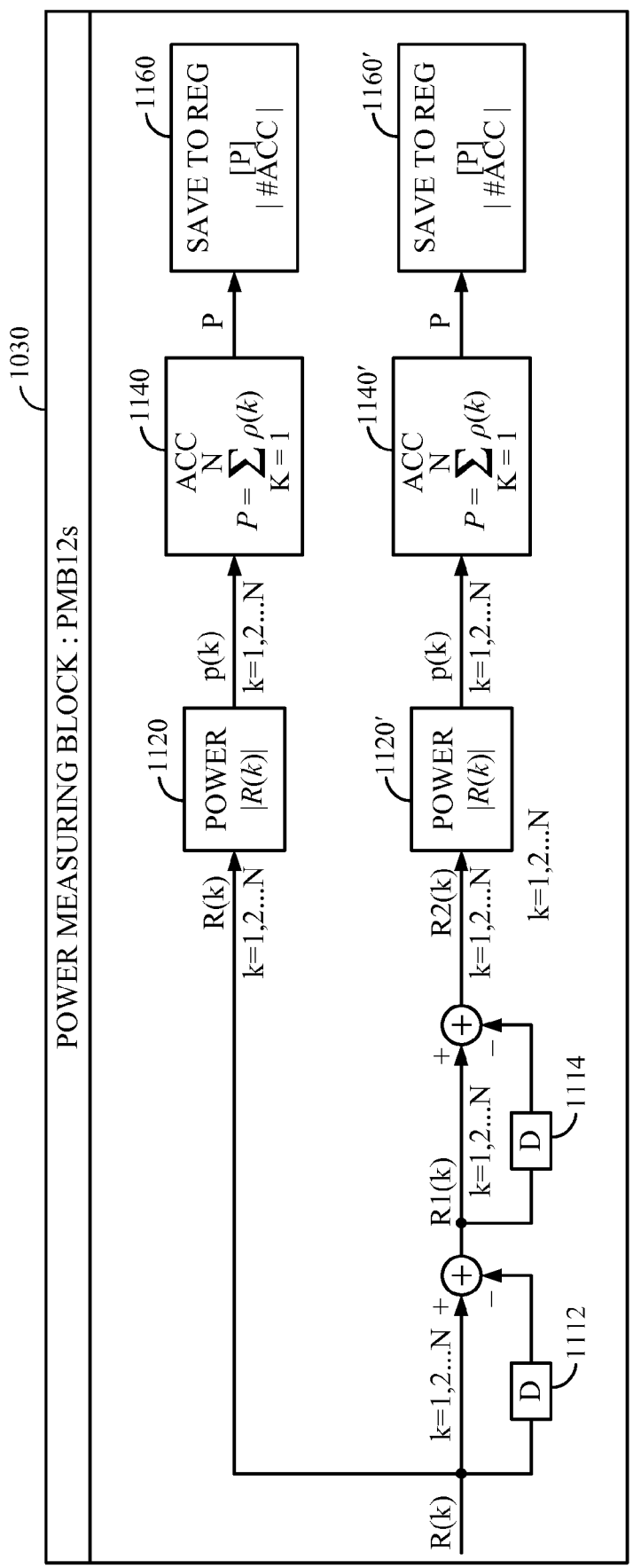
FIG. 11 illustrates logic for an example arrangement of power measuring blocks with differential signal logic.

FIG. 11 illustrates a differential PMB 1030 in accordance with a certain embodiment of the present disclosure. As illustrated, the differential PMB 1030 generally includes upper and lower branches, each having a "single" PMB such as that shown in FIG. 9. While the upper branch calculates power on the original signal R(k), the lower branch may calculate power on a differential signal generated by performing N-order differential operations on the original signal (with differential logic 1112 and 1114). An accumulated power measurement for the original signal (Pa) may be stored in a first register 1160 via accumulation logic 1140, while power measurement for the differential signal (Pd) may be stored in a different register 1160'.

The number (order) of differential stages may vary for certain different embodiments and the particular number of differential stages used may be determined by considering a number of factors. While multiple stages may help reduce interference, too many stages may increase complexity and, in some cases, may actually increase an amount of noise included in the final signal quality estimate. For certain embodiments, the number of differential operations to be performed may be controlled dynamically, for example, via signal programmed by software.

For example, a signal controllable via software (Dcon) may be used to effectively disable differential logic 1114 (with one of the inputs to the differential logic kept at zero). The differential order may also affect the number of accumulated power signals, for example, with accumulation logic 1140' summing from 2 to N (samples) power measurements for a differential order of 1 and from 3 to N for a differential order of 2.

Figure 12:
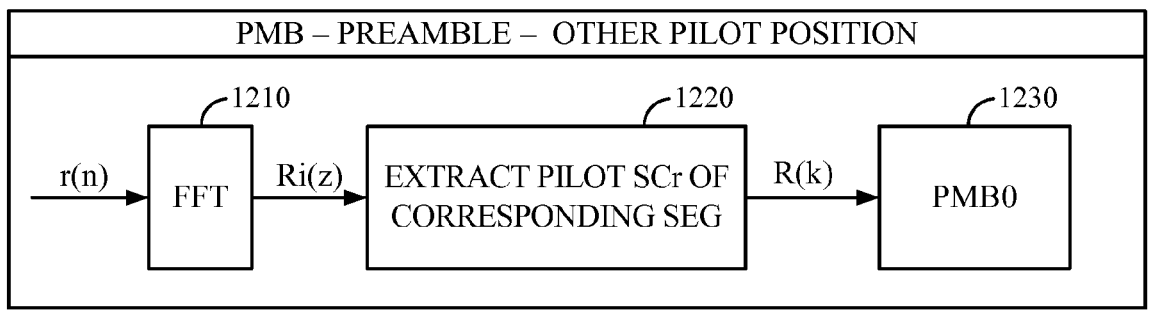
FIG. 12 illustrates logic for another example power measuring block for a pilot position.

FIG. 12 illustrates example logic for measuring power of pilot signal sub-carrier positions corresponding to other segments. As illustrated, the raw signals r(n) are first transformed into the frequency domain (e.g., by FFT logic 1210). Pilot signals at sub-carriers corresponding to another segment are then extracted with logic 1220. For example, assuming segment 0 and the preamble illustrated in FIG. 5, pilot signals from another segment (e.g., Seg1 at sub-carriers SC88, SC92, and so forth), may be extracted.

Power calculations may then be performed, for example, utilizing a power measuring block (1230), which may perform operations as the PMB shown in FIG. 9. For certain embodiments, separate PMBs may be utilized to measure power for pilot signals of each of the "other segments." For certain other embodiments, however, a single PMB may be utilized to measure power for pilot signals of both.

The power measurements described above may be utilized to calculate a variety of signal quality parameters to feed back to a base station. The various power measurements may be used to extract individual power measurements for signal, interference and noise. For some calculations, accumulated power measurements taken above may be used, for example, if the same number of power measurements were accumulated. If a different number of measurements were accumulated, however, mean power measurements may be used. To facilitate understanding, the following description will assume mean power measurements are used.

Noise power ($P_n^{np}$) may be extracted from the power measurement taken at the null position:

$$P_n^{np} = P_{null\_mean} \quad (2)$$

The total power of the signal, the interference, and the noise $P_{sin}^{sp}$ can be extracted from the power measurements taken at the self pilot position, as described by Equation 3, below:

$$P_{sin}^{sp} = P_{a\_spilot\_mean} \quad (3)$$

The total power of the interference and noise $P_{in}^{sp}$ can be extracted from the power measurements taken at the self pilot position, as described by Equation 4, below, where F is a factor dictated by the differential order.

$$P_{in}^{sp} = \frac{P_{d\_spilot\_mean}}{F} \quad (4)$$

The default value of F is 2 for a first order differential and 6 (noise power is increased by 6 in $2^{nd}$ order. The default value of F is 2 for a first order differential because the noise power is increased by two due to the use of two independent noise samples. The default value of F is 6 for a second order differential because, due to the use of three independent samples for the calculation. One of the three samples (i.e. mid position), may be used twice, so the corresponding noise power may be increased by 6 (2+4) for the second order differential.

Consequently, by taking the difference of Equation 3 and Equation 4, channel effects may be mitigated and the signal power $P_s^{sp}$ may be extracted.

$$P_s^{sp} = P_{sin}^{sp} - P_{in}^{sp} \quad (5)$$

While this signal power includes a boosting factor $B_{SS}$ of the corresponding signal at the self pilot position of the preamble, this may be taken into consideration in signal quality calculations below.

Interference power $P_i^{sp}$ can be extracted, as described by Equation 6, below, subtracting the noise power (Equation 2) from the total power of interference and noise (Equation 4).

$$P_i^{sp} = P_{in}^{sp} - P_n^{np} \quad (6)$$

While this interference power includes a factor $B_{SI}$ that is a boosting factor of the interference signal at the self pilot position of the preamble, this may be taking into consideration in signal quality calculations below.

From the individual power calculations for signal, interference, and noise determined above a variety of signal quality parameters may be calculated. For example, the normalized carrier to noise ratio (CNR), excluding signal boosting, may be described by Equation 7, below.

$$CNR_{norm}^{sp} = \left(\frac{P_s^{sp}}{B_{ss}}\right) / (P_n^{np}) \quad (7)$$

The un-normalized carrier to interference ratio (CIR), may be calculated as shown in Equation 8, where $P_s^{sp}$ excludes signal boosting, while $P_i^{sp}$ includes interference boosting.

$$CIR_{unnorm}^{sp} = \left(\frac{P_s^{sp}}{B_{ss}}\right) / (P_i^{sp}) \quad (8)$$

The normalized CIR may be calculated as shown in Equation 9. Note that in normalizing the CIR, both interference boosting and signal boosting are removed.

$$CIR_{norm}^{sp} = \left(\frac{P_s^{sp}}{B_{ss}}\right) / \left(\frac{P_i^{sp}}{B_{si}}\right) \quad (9)$$

The un-normalized CINR may be calculated as shown in Equation 10, where $P_s^{sp}$ excludes signal boosting, while $P_{in}^{sp}$ includes interference boosting.

$$CINR_{unnorm}^{sp} = \left(\frac{P_s^{sp}}{B_{ss}}\right) / (P_{in}^{sp}) \quad (10)$$

The normalized CINR may be calculated as shown in Equation 11. Note that in normalizing the CINR, both interference boosting and signal boosting are removed.

$$CINR_{norm}^{sp} = \left(\frac{P_s^{sp}}{B_{ss}}\right) / \left(\frac{P_{in}^{sp} + (B_{si} - 1)P_n^{np}}{B_{si}}\right) \quad (11)$$

The total power of the interference and noise can be extracted from power measurements taken from positions other than the pilot position, as described in Equations 12 and 13.

$$P_{in}^{op1} = P_{opilot1\_mean} \quad (12)$$

$$P_{in}^{op2} = P_{opilot2\_mean} \quad (13)$$

Using Equations 5, 12 and 13, the interference power may be extracted as described in Equations 14 and 15 below.

$$P_i^{op1} = P_{in}^{op2} - P_n^{np} \quad (14)$$

$$P_i^{op2} = P_{in}^{op2} - P_n^{np} \quad (15)$$

Note that the interference powers described in Equations 14 and 15 include the factors $B_{oi1}$ and $B_{oi2}$, respectively, which are boosting factors of the interference signal at positions other than the pilot position of the preamble.

The un-normalized CIR, may be calculated as shown in Equation 16, where $P_s^{sp}$ excludes signal boosting, while $P_i^{sp}$, $P_i^{op1}$ and $P_i^{op2}$ include interference boosting.

$$CIR_{unnorm}^{sop} = \left(\frac{P_s^{sp}}{B_{ss}}\right) \bigg/ \left(P_i^{sp} + P_i^{op1} + P_i^{op2}\right) \quad (16)$$

The normalized CIR, which may be calculated as shown in Equation 17, excludes signal boosting and interference boosting.

$$CIR_{norm}^{sop} = \left(\frac{P_s^{sp}}{B_{ss}}\right) \bigg/ \left(\left(\frac{P_i^{sp}}{B_{si}}\right) + \left(\frac{P_i^{op1}}{B_{oi1}}\right) + \left(\frac{P_i^{op2}}{B_{oi2}}\right)\right) \quad (17)$$

The un-normalized CINR may be calculated as shown in Equation 18, where $P_s^{sp}$ excludes signal boosting, while $P_{in}^{sp}$, $P_i^{op1}$ and $P_i^{op2}$ include interference boosting.

$$CINR_{unnorm}^{sp} = \left(\frac{P_s^{sp}}{B_{ss}}\right) \bigg/ \left(P_{in}^{sp} + P_{in}^{op1} + P_{in}^{op2} - 2P_n^{sp}\right) \text{ or} \quad (18)$$

$$= \left(\frac{P_s^{sp}}{B_{ss}}\right) \bigg/ \left(P_i^{sp} + P_i^{op1} + P_i^{op2} + P_n^{sp}\right)$$

The normalized CIR, which may be calculated as shown below in Equation 19, excludes signal boosting and interference boosting.

$$CINR_{norm}^{sp} = \left(\frac{P_s^{sp}}{B_{ss}}\right) \bigg/ \left(\left(\frac{P_i^{sp}}{B_{si}}\right) + \left(\frac{P_i^{op1}}{B_{oi1}}\right) + \left(\frac{P_i^{op2}}{B_{oi2}}\right) + P_n^{sp}\right) \quad (19)$$

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIG. 6, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing signal quality calculations in a communication device, comprising:
   transforming, into a frequency domain, raw preamble signals received from a station;
   extracting first pilot sub-carrier signals corresponding to a first preamble segment from the transformed preamble signals;
   performing N-order differential operations on the extracted first pilot sub-carrier signals to generate differential pilot signals, wherein N is a finite integer greater than 1, wherein performing the N-order differential operations comprises: calculating and outputting a plurality of values each indicating a difference between adjacent input samples of the extracted first pilot sub-carrier signals that are input sequentially, and sequentially repeating the calculating and outputting on the plurality of values (N−1) times to generate the differential pilot signals;
   taking separate power measurements for the extracted first pilot sub-carrier signals and the differential pilot signals;
   calculating one or more signal quality parameters using the separate power measurements for the extracted first pilot sub-carrier signals and the differential pilot signals; and
   transmitting the one or more signal quality parameters to the station.

2. The method of claim 1, further comprising:
   extracting null sub-carrier signals from the transformed preamble signals;
   measuring power of the null sub-carrier signals; and
   calculating the one or more signal quality parameters using the separate power measurements for the extracted pilot sub-carrier signals and the differential pilot signals and the power measurement for the null sub-carrier signals.

3. The method of claim 1, further comprising:
   extracting second pilot sub-carrier signals corresponding to a second preamble segment from the transformed preamble signals;
   measuring power of the second pilot sub-carrier signals; and
   calculating the one or more signal quality parameters using the power measurement for the second pilot sub-carrier signals.

4. The method of claim 1, wherein calculating the one or more signal quality parameters comprises extracting separate power measurements for signal, noise, and interference signal components.

5. The method of claim 1, wherein the value of N is adjustable.

6. The method of claim 5, wherein N is adjustable under software control.

7. The method of claim 1, wherein calculating the one or more signal quality parameters comprises calculating at least one of:
   carrier to noise ratio (CNR), carrier to interference ratio (CIR), and carrier to interference/noise ratio (CINR).

8. A receiver for performing signal quality calculations in a communication device, comprising a processor coupled to a memory, the memory storing program codes executable by the processor, wherein the processor is configured to:
   transform, into a frequency domain, raw preamble signals received from a station and extracting first pilot sub-carrier signals corresponding to a first preamble segment from the transformed preamble signals;
   perform N-order differential operations on the extracted first pilot sub-carrier signals to generate differential pilot signals, wherein N is a finite integer greater than 1, wherein the processor is configured to perform the N-order differential operations by calculating and outputting a plurality of values each indicating a difference between adjacent input samples of the extracted first pilot sub-carrier signals that are input sequentially, and sequentially repeating the calculating and outputting on the plurality of values (N−1) times to generate the differential pilot signals;
   take separate power measurements for the extracted first pilot sub-carrier signals and the differential pilot signals; and
   calculate one or more signal quality parameters using the separate power measurements for the extracted first pilot sub-carrier signals and the differential pilot signals.

9. The receiver of claim 8, wherein the processor is further configured to:
   extract null sub-carrier signals from the transformed preamble signals;
   measure power of the null sub-carrier signals; and
   calculate the one or more signal quality parameters using the separate power measurements for the extracted pilot sub-carrier signals and the differential pilot signals and the power measurement for the null sub-carrier signals.

10. The receiver of claim 8, wherein the processor is further configured to:
    extract second pilot sub-carrier signals corresponding to a second preamble segment from the transformed preamble signals;
    measure power of the second pilot sub-carrier signals; and
    calculate the one or more signal quality parameters using the power measurement for the second pilot sub-carrier signals.

11. The receiver of claim 8, wherein calculating the one or more signal quality parameters comprises extracting separate power measurements for signal, noise, and interference signal components.

12. The receiver of claim 8, wherein the value of N is adjustable.

13. The receiver of claim 12, wherein N is adjustable under software control.

14. The receiver of claim 8, wherein calculating the one or more signal quality parameters comprises calculating at least one of:
    carrier to noise ratio (CNR), carrier to interference ratio (CIR), and carrier to interference/noise ratio (CINR).

15. An apparatus for performing signal quality calculations in a communication device, comprising:
    means for transforming, into a frequency domain, raw preamble signals received from a station;
    means for extracting first pilot sub-carrier signals corresponding to a first preamble segment from the transformed preamble signals;
    means for performing N-order differential operations on the extracted first pilot sub-carrier signals to generate differential pilot signals, wherein N is a finite integer greater than 1, wherein the means for performing the N-order differential operations comprises: means for calculating and outputting a plurality of values each indicating a difference between adjacent input samples of the extracted first pilot sub-carrier signals that are input sequentially, and means for sequentially repeating the calculating and outputting on the plurality of values (N−1) times to generate the differential pilot signals;

means for taking separate power measurements for the extracted first pilot sub-carrier signals and the differential pilot signals;

means for calculating one or more signal quality parameters using the separate power measurements for the extracted first pilot sub-carrier signals and the differential pilot signals; and means for transmitting the one or more signal quality parameters to the station.

16. The apparatus of claim 15, wherein:
the means for transforming extracts null sub-carrier signals from the transformed preamble signals;
the means for measuring measures power of the null sub-carrier signals; and
the means for calculating signal quality calculates the one or more signal quality parameters using the separate power measurements for the extracted pilot sub-carrier signals and the differential pilot signals and the power measurement for the null sub-carrier signals.

17. The apparatus of claim 15, wherein:
the means for transforming extracts second pilot sub-carrier signals corresponding to a second preamble segment from the transformed preamble signals;
the means for measuring measures power of the second pilot sub-carrier signals; and
the means for calculating signal quality calculates the one or more signal quality parameters using the power measurement for the second pilot sub-carrier signals.

18. The apparatus of claim 15, wherein the means for calculating signal quality calculates the one or more signal quality parameters by extracting separate power measurements for signal, noise, and interference signal components.

19. The apparatus of claim 15, wherein the value of N is adjustable.

20. The apparatus of claim 15, wherein the means for calculating signal quality calculates at least one of:
carrier to noise ratio (CNR), carrier to interference ratio (CIR), and carrier to interference/noise ratio (CINR).

21. A mobile device, comprising:
a receiver for transforming, into a frequency domain, raw preamble signals received from a station and extracting first pilot sub-carrier signals corresponding to a first preamble segment from the transformed preamble signals;
measuring logic for:
performing N-order differential operations on the extracted first pilot sub-carrier signals to generate differential pilot signals, wherein N is a finite integer greater than 1, wherein the measuring logic for performing the N-order differential operations comprises logic for: calculating and outputting a plurality of values each indicating difference between adjacent input samples of the extracted first pilot sub-carrier signals that are input sequentially, and sequentially repeating the calculating and outputting on the plurality of values (N−1) times to generate the differential pilot signals,
taking separate power measurements for the extracted first pilot sub-carrier signals and the differential pilot signals, and
calculating one or more signal quality parameters using the separate power measurements for the extracted first pilot sub-carrier signals and the differential pilot signals; and a transmitter for transmitting the one or more signal quality parameters to the station.

22. The mobile device of claim 21, wherein:
the receiver extracts null sub-carrier signals from the transformed preamble signals; and
the measuring logic measures power of the null sub-carrier signals and calculates the one or more signal quality parameters using the separate power measurements for the extracted pilot sub-carrier signals and the differential pilot signals and the power measurement for the null sub-carrier signals.

23. The mobile device of claim 21, wherein:
the receiver extracts second pilot sub-carrier signals corresponding to a second preamble segment from the transformed preamble signals; and
the measuring logic measures power of the second pilot sub-carrier signals and calculates the one or more signal quality parameters using the power measurement for the second pilot sub-carrier signals.

24. The mobile device of claim 21, wherein the value of N is adjustable.

25. The mobile device of claim 24, wherein the value of N is adjustable under software control.

26. A computer-program product for performing signal quality calculations in a communication system comprising a non-transitory computer readable medium having a set of instructions stored thereon, the set of instructions being executable by one or more processors and the set of instructions comprising:
instructions for transforming, into a frequency domain, raw preamble signals received from a station;
instructions for extracting first pilot sub-carrier signals corresponding to a first preamble segment from the transformed preamble signals;
instructions for performing N-order differential operations on the extracted first pilot sub-carrier signals to generate differential pilot signals, wherein N is a finite integer greater than 1, wherein the instructions for performing the N-order differential operations comprise instructions for: calculating and outputting a plurality of values each indicating difference between adjacent input samples of the extracted first pilot sub-carrier signals that are input sequentially, and sequentially repeating the calculating and outputting on the plurality of values (N−1) times to generate the differential pilot signals;
instructions for taking separate power measurements for the extracted first pilot sub-carrier signals and the differential pilot signals;
instructions for calculating one or more signal quality parameters using the separate power measurements for the extracted first pilot sub-carrier signals and the differential pilot signals; and
instructions for transmitting the one or more signal quality parameters to the station.

27. The computer-program product of claim 26, wherein:
the instructions for transforming extracts null sub-carrier signals from the transformed preamble signals;
the instructions for measuring measures power of the null sub-carrier signals; and
the instructions for calculating signal quality calculates the one or more signal quality parameters using the separate power measurements for the extracted pilot sub-carrier signals and the differential pilot signals and the power measurement for the null sub-carrier signals.

28. The computer-program product of claim 26, wherein:
the instructions for transforming extracts second pilot sub-carrier signals corresponding to a second preamble segment from the transformed preamble signals;
the instructions for measuring measures power of the second pilot sub-carrier signals; and
the instructions for calculating signal quality calculates the one or more signal quality parameters using the power measurement for the second pilot sub-carrier signals.

29. The computer-program product of claim 26, wherein the instructions for calculating signal quality calculates the one or more signal quality parameters by extracting separate power measurements for signal, noise, and interference signal components.

30. The computer-program product of claim 26, wherein the value of N is adjustable.

31. The computer-program product of claim 26, wherein the instructions for calculating signal quality calculates at least one of:
carrier to noise ratio (CNR), carrier to interference ratio (CIR), and carrier to interference/noise ratio (CINR).

32. The method of claim 1, wherein the performing of the N-order differential operations to generate the differential pilot signals does not include direct multiplication.

33. The receiver of claim 8, wherein the performing of the N-order differential operations to generate the differential pilot signals does not include direct multiplication.

34. The apparatus of claim 15, wherein the means for performing of the N-order differential operations to generate the differential pilot signals does not include direct multiplication.

35. The mobile device of claim 21, wherein the performing of the N-order differential operations to generate the differential pilot signals does not include direct multiplication.

36. The computer-program product of claim 26, wherein the performing of the N-order differential operations to generate the differential pilot signals does not include direct multiplication.

* * * * *